US012326232B2

(12) United States Patent
Knobloch et al.

(10) Patent No.: US 12,326,232 B2
(45) Date of Patent: Jun. 10, 2025

(54) LIGHTING DEVICE FOR VEHICLE HEADLAMP

(71) Applicant: ZKW Group GmbH, Wieselburg (AT)

(72) Inventors: Christian Knobloch, Persenbeug-Gottsdorf (AT); Markus Danner, Ollersdorf (AT); Patrick Schmidt, Wieselburg (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/621,584

(22) Filed: Mar. 29, 2024

(65) Prior Publication Data

US 2024/0337361 A1 Oct. 10, 2024

(30) Foreign Application Priority Data

Apr. 4, 2023 (EP) ..................................... 23166618

(51) Int. Cl.

*F21S 41/63* (2018.01)
*F21S 41/275* (2018.01)
*F21S 41/40* (2018.01)
*F21S 41/663* (2018.01)

(52) U.S. Cl.

CPC ............. *F21S 41/63* (2018.01); *F21S 41/275* (2018.01); *F21S 41/40* (2018.01); *F21S 41/663* (2018.01)

(58) Field of Classification Search

CPC .......... F21S 41/63; F21S 41/275; F21S 41/40; F21S 41/663

See application file for complete search history.

(56) References Cited

U.S. PATENT DOCUMENTS

2016/0356444 A1 12/2016 Ohno
2016/0377250 A1 12/2016 Ohno
2018/0238511 A1 8/2018 Hartmann et al.
2019/0257492 A1 8/2019 Motohashi

FOREIGN PATENT DOCUMENTS

JP 2022028514 A 2/2022

OTHER PUBLICATIONS

Extended European Search Report for European Patent Application No. 23166618.1 dated Sep. 1, 2023 (5 Pages).

*Primary Examiner* — Elmito Breval
(74) *Attorney, Agent, or Firm* — Eversheds Sutherland (US) LLP

(57) ABSTRACT

A lighting device for a vehicle headlamp includes a plurality of light sources; a first lens element (FLE) downstream of the light sources; and a second lens element (SLE) downstream of the FLE. A light receiving surface (LRS) of the FLE is formed by a main-area and a sub-area. The light sources and LRS are distanced to each other whereby a first fraction of light is emitted towards the sub-area and a second fraction is emitted towards the main-area. The light sources, FLE, and SLE are configured to create a complete or partial, preferably adaptive, high beam light distribution with two sections. The sub-area and main-area are configured to refract impinging light, wherein refraction of light by the sub-area and main-area is such that a first intensity maximum of a first section is vertically lower in front of the lighting device than a second intensity maximum of the second section.

20 Claims, 3 Drawing Sheets

LIGHTING DEVICE FOR VEHICLE HEADLAMP

CROSS-REFERENCE TO RELATED APPLICATIONS

This application claims priority to European Patent Application No. 23166618.1, filed Apr. 4, 2023, which is incorporated herein by reference.

FIELD OF THE INVENTION AND DESCRIPTION OF PRIOR ART

The invention relates to a lighting device for a vehicle headlamp, said lighting device is configured to generate different light distributions, wherein the lighting device comprises:

a plurality of light sources arranged in a first light source group and a second light source group, wherein in an installation position of the lighting device-when the lighting device is installed in a vehicle headlamp in a vehicle—the first light source group is disposed vertically higher than the second light source group, wherein the plurality of light sources emit light along a main beam direction, a first lens element, arranged downstream of the plurality of light sources along the main beam direction, wherein the first lens element comprises a light receiving surface, facing the plurality of light sources, and a light emitting surface, opposite of the light receiving surface, wherein the first lens element is configured to receive light from the plurality of light sources via the light receiving surface and to emit received light via the light emitting surface, wherein the first lens element has an optical axis, wherein the first lens element is configured to refract light, in respect to its optical axis, and a second lens element, arranged downstream of the first lens element along the main beam direction, configured to receive refracted light from the first lens element and to project said light in front of the lighting device, wherein the second lens element has an optical axis.

The invention further relates to a light module for a vehicle headlamp, comprising a lighting device and a secondary lighting device.

The invention also relates to a vehicle headlamp comprising a lighting device or a light module.

In the prior art, lighting devices for generating different light distributions and which comprise light sources and a corresponding lens system are known. Usually, light from light sources is pre-formed by a collimator device before said light gets emitted towards the lens system, which is configured to project said light coming from the collimator device in form of a light distribution, e.g. into a traffic space in front of the lighting device. It is also known to use multiple collimator devices which correspond to different light sources respectively, in order to create different light distributions. For example, a first collimator corresponds to a first light source and creates a first light distribution in conjunction with the lens system, and a second collimator corresponds to a second light source and creates a second light distribution in conjunction with the lens system. A drawback of those systems is the complex construction and the large number of optical components needed to create different light distributions.

SUMMARY OF THE INVENTION

It is an object of the invention to provide a lighting device for a vehicle head lamp, which is capable of creating different light distributions and also has a simplified yet effective constriction.

This object is achieved by a lighting device according to claim 1. Preferred embodiments are described in dependent claims.

According to a first aspect of the invention, the first lens element and the second lens element are configured and arranged to each other, such that their optical axes are aligned co-axial and that the first lens element and the second lens element create a common focal point, which lies in a common focal plane, which is located on a, the second lens element averting, side of the first lens element, wherein the plurality of light sources are disposed on a light source holder, wherein the light source holder is disposed relative to the first lens element and the second lens element, such that the main beam direction of light emitted by the plurality of light sources is essentially parallel to the optical axis of the first lens element and the optical axis of the second lens element, wherein the light receiving surface of the first lens element is formed by a main-area and a sub-area, wherein the sub-area comprises a plurality of refraction elements each comprising a light entry section, wherein the refraction elements of the sub-area are configured in such a way, that impinging light gets refracted differently, preferably stronger towards the optical axis, than light refracted by the main-area, wherein the light source holder and the light receiving surface of the first lens element are distanced to each other, such that a first fraction of light from the first light source group is emitted towards the sub-area and a second fraction, which is preferably larger than the first fraction, of light from the first light source group is emitted towards the main-area, and such that a first fraction of light from the second light source group is emitted towards the sub-area and a second fraction, which is preferably larger than the first fraction, of light from the second light source group is emitted towards the main-area of light receiving surface, wherein the first fraction of light from the first light source group is larger than the first fraction of light from the second group of light sources, wherein the first light source group, the second light source group, the first lens element and the second lens element are configured to create a complete or partial, preferably adaptive, high beam light distribution, wherein the high beam light distribution is formed by at least two sections, wherein the sub-area and the main-area of the light receiving surface of the first lens element are configured to refract impinging light in such a way, that the refracted first fraction and second fraction of light from the first light source group correspond to a first illuminated area, which forms a first section of the high beam light distribution, and the refracted first fraction and second fraction of light from the second light source group respectively correspond to a second illuminated area, which forms a second section of the high beam light distribution, wherein said first section has a first intensity maximum and said second section has a second intensity maximum, wherein refraction of light by the sub-area and refraction of light by the main-area is such that the first intensity maximum of the first section is vertically lower in front of the lighting device than the second intensity maximum of the second section.

This has the advantage of creating a complete or partial, preferably adaptive, high beam light distribution, wherein the first section of the high beam light distribution, which is essentially generated by light being refracted by the refraction elements forming the sub-area, creates a smooth light intensity fade out below the H-H line or, in other words, a light spread below the H-H line. Therefore, in the forefield of the light distribution, i.e. an area closer to the lighting device compared to the far field, a transition between an illuminated area and a non-illuminated area is smoother. In other words, the invention provides a blurred high beam light distribution, wherein the blurring takes place in an area close to the lighting device or in a section of the light distribution which is vertically lower than the H-H line. Each light source of the first light source row emits a light bundle, which all together form a first light bundle row, wherein each light source of the second light source row emits a light bundle, which together form a second light bundle row. The lighting device can comprise more than two lens elements, e.g. a third or more lens element. In this disclosure, the term "refraction" is defined as a change of the propagation direction of a light bundle or light rays, after traversing an optical element, e.g. the first lens element. The term "downstream" is defined as along the direction of light propagation. Preferably, light sources of the first light source group and light sources of the second light source group are operable on two modes, an active/ON mode (in which light gets emitted from the light sources) and an inactive/OFF state (in which no light gets emitted from the light sources). Preferably, the first section of the high beam light distribution overlaps at least partially with the second section of the high beam light distribution, said overlap can be measures e.g. on an ECE 25 m test screen. The first section of the high beam light distribution may overlap with a lower portion of the second section, wherein said lower portion of the second section is located below the H-H line. Preferably, the light module is configured to generate different sections of a segmented light distribution or different segmented light distributions. Preferably, the light source holder can be (and therefore also the plurality of light sources) very close to the light receiving surface of the first lens element, e.g. a normal distance (along the main beam direction) between the plurality of light sources and the light receiving surface of the first lens element can be smaller than the width (or thickness) of the first lens element along its optical axis. Preferably, the normal distance (along the main beam direction) between the plurality of light sources (or the light source holder) and the light receiving surface of the first lens element can be smaller than the normal distance between the light emitting surface of the first lens element and a light receiving surface of the second lens element. The plurality of light sources can be disposed at a light source surface of the light source holder, wherein the light source surface lies essentially within the common focal plane. Preferably, the first section of the high beam light distribution comprises a first sub-section, with an intensity maximum, corresponding to light from the first light source group refracted by the sub-area, and a second sub-section, with an intensity maximum, corresponding to light from the first light source group refracted by the main-area. Due to the stronger refraction by the sub-area, the intensity maximum of the first sub-section can be vertically lower than the intensity maximum of the second sub-section. Preferably, the second section of the high beam light distribution comprises a first sub-section, with an intensity maximum, corresponding to light from the second light source group refracted by the sub-area, and a second sub-section, with an intensity maximum, corresponding to light from the second light source group refracted by the main-area. Due to the stronger refraction by the sub-area, the intensity maximum of the first sub-section can be vertically lower than the intensity maximum of the second sub-section. The first fraction of light from the first light source group (as well as the second light source group) can be larger or smaller than the second fraction, depending on the position of the first (or second) light source group relative to the light receiving surface of the first lens element.

Advantageously, the light sources of the first light source group are disposed along a first row on the light source holder and light sources of the second light source group are disposed along a second row on the light source holder, wherein the second row is essentially parallel to the first row.

Advantageously, the first light source group and the second light source group are oriented on the light source holder—in the installation position—along horizontal lines respectively.

Advantageously, the refraction elements are formed as prismatic elements, having an essentially triangular cross-section, in the installation position, along a vertical sectional plane, wherein preferably each prismatic element has a longitudinal extension, which is orthogonal to the optical axis and preferably oriented horizontally.

Advantageously, the refraction elements are formed as recesses or protrusions within the light receiving surface of the first lens element, wherein preferably the sub-area is surrounded by the main-area.

Advantageously, the intensity maximum of the first illuminated area, formed by refracted light by the sub-area, is located below a H-H line in an Isolux-diagram. In this disclosure, the H-H line in an Isolux-diagram is in accordance with the ECE regulations regarding vehicle headlamps, in which an illumination produced by a vehicle headlamp shall be checked on a vertical screen set at a distance of 25 m in front of the headlamp and at right angles to its axis.

Advantageously, the intensity maximum of the second illuminated area, formed by refracted light by the main-area, is located essentially at or above a H-H line in an Isolux-diagram.

Advantageously, each light source of the first light source group and each light source of the second light source group is individually controllable, depending on an operation mode of the lighting device.

Advantageously, the plurality of light sources comprise a third light source group, which is disposed vertically lower than the second light source group, wherein light from the third light source group is emitted essentially towards the main-area, wherein refracted light from the third light source group corresponds to a third illuminated area, which forms a third section of the high beam light distribution, wherein said third section has a third intensity maximum, wherein refraction of light from the third light source group by the main-area is such that the third intensity maximum is vertically higher than the first intensity maximum and the second intensity maximum in front of the lighting device.

Advantageously, the third light source group is disposed in a third row on the light source holder, preferably oriented along a horizontal line, parallel to the second row, wherein the third row is vertically lower than the second row.

Advantageously, the lighting device comprises a shade element, preferably disposed—in the installation position—vertically above the first lens element, said shade element is configured to block the first fraction of light from the second light source group, which entered the first lens element via the sub-area, from traversing towards the second lens element.

Advantageously, the plurality of light sources are disposed at a light source surface of the light source holder, wherein the light source surface lies essentially within the common focal plane.

According to a second aspect of the invention, a light module for a vehicle headlamp is provided, said light module is configured to generate different light distributions, each correlating to a different operation mode of the light module, wherein the light module comprises a lighting device and a secondary lighting device, configured to create a portion of a low beam light distribution, wherein the light module is configured to operate in at least two operation modes, wherein:

- in a first operation mode of the light module, at least a portion of the first light source group and at least a portion of the second light source group of the lighting device are active and configured to create a complete or partial, preferably adaptive, high beam light distribution in conjunction with the first lens element and the second lens element, wherein the secondary lighting device is active, and
- in a second operation mode of the light module, a first portion of the first light source group is active and a second portion of the first light source group and the second light source group is inactive, wherein in the second operation mode the active first light source group, the first lens element and the second lens element are configured to create a first portion of an asymmetric low beam light distribution, wherein a first illuminated area, which is created by refracted light from the active first portion of the first light source group by the sub-area, and preferably also by the main-area, corresponds to the first portion of the asymmetric low beam light distribution, wherein the secondary lighting device is configured to create a second portion of an asymmetric low beam light distribution, wherein the first portion and the second portion form the asymmetric low beam light distribution, wherein the first portion forms an asymmetric portion of the asymmetric light distribution, which illuminates an area on the driving side of a vehicle, when the light module is installed in a vehicle.

Advantageously, the second portion of the asymmetric low beam light distribution, which is created by the secondary lighting device, forms a light-dark boundary of the asymmetric low beam light distribution.

According to a third aspect of the invention, a vehicle headlamp is provided, comprising a lighting device or a light module.

BRIEF DESCRIPTION OF THE DRAWINGS

In the following, in order to further demonstrate the present invention, illustrative and non-restrictive embodiments are discussed, as shown in the drawings, which show.

DETAILED DESCRIPTION OF EMBODIMENTS OF THE INVENTION

Figure 1:
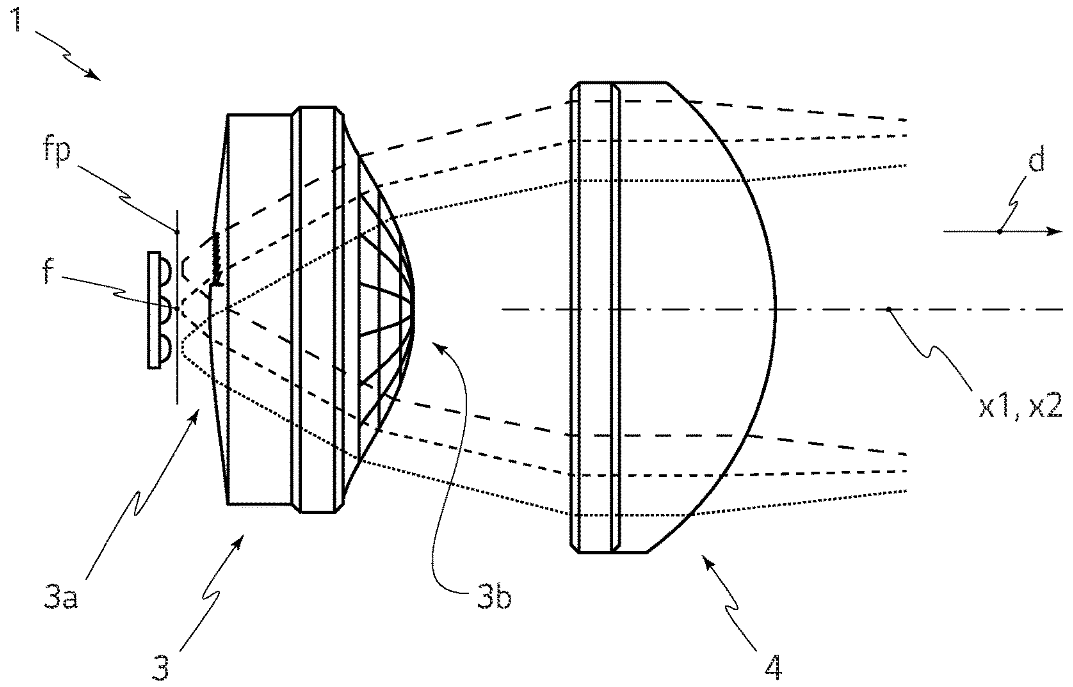
FIG. 1 a lighting device according to an embodiment of the invention.
Figure 2:
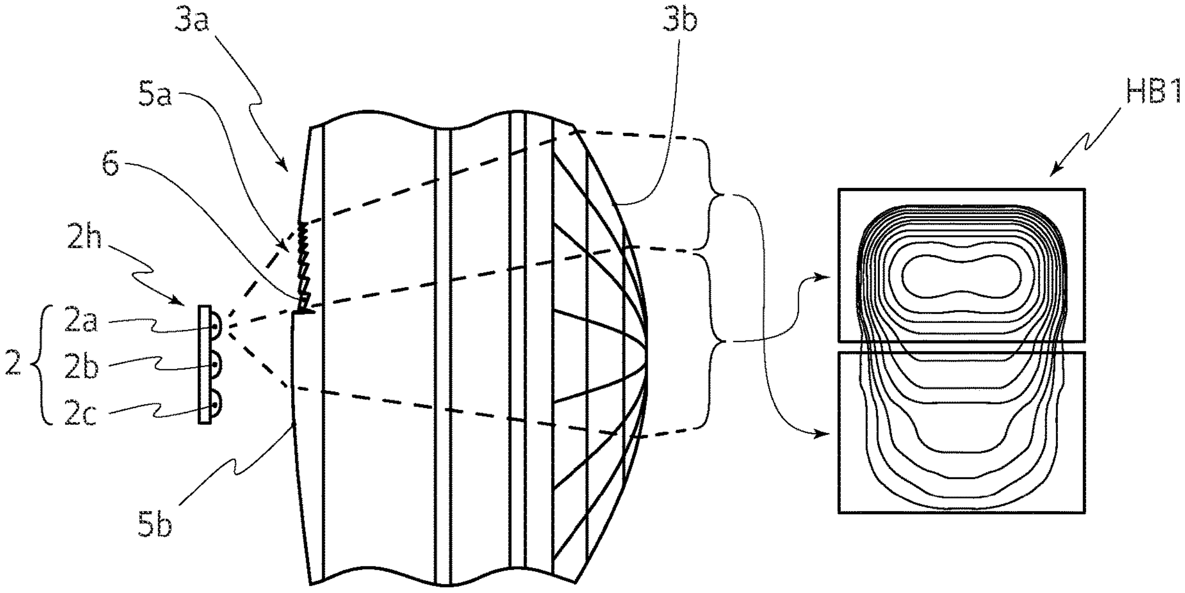
FIG. 2 a detailed view of a first lens element of the lighting device of FIG. 1, FIG. 3A an embodiment of a first lens element, FIG. 3B another embodiment of a first lens element, FIG. 4A-4C different sections of a light distribution created with a lighting device according to the invention, FIG. 5A-5C different illuminations of a light receiving surface of the first lens element, and FIG. 6 a light module according to another embodiment of the invention.

FIG. 1 shows a lighting device 1 for a vehicle headlamp and FIG. 2 shows a detailed view of said lighting device 1. The lighting device 1 is configured to generate different sections of a light distribution, in the shown embodiment an adaptive segmented high beam light distribution. The lighting device 1 comprises a plurality of light sources 2 arranged in a first light source group 2*a* and a second light source group 2*b*. In an installation position of the lighting device 1—when the lighting device 1 is installed in a vehicle headlamp in a vehicle—the first light source group 2*a* is disposed vertically higher than the second light source group 2*b*. The plurality of light sources 2 emit light along a main beam direction d.

In the shown embodiment, the light sources of the first light source group 2*a* are disposed along a first row on the light source holder 2*h* and the light sources of the second light source group 2*b* are disposed along a second row on the light source holder 2*h*, wherein the second row is essentially parallel to the first row. The first light source group 2*a* and the second light source group 2*b* (or in other words the first row of light sources and the second row of light sources) are oriented on the light source holder 2*h*—in the installation position—along horizontal lines respectively.

Preferably, each light source of the first light source group 2*a* and each light source of the second light source group 2*b* is individually controllable, depending on an operation mode of the lighting device 1, or depending on what section of a segmented light function shall be illuminated.

The lighting device 1 comprises a first lens element 3, arranged downstream of the plurality of light sources 2 along the main beam direction d. The first lens element 3 comprises a light receiving surface 3*a*, facing the plurality of light sources 2, and a light emitting surface 3*b*, opposite of the light receiving surface 3*a*. The first lens element 3 is configured to receive light from the plurality of light sources 2 via the light receiving surface 3*a* and to emit received light via the light emitting surface 3*b*. The first lens element 3 has an optical axis x1. The first lens element 3 is configured to refract light, in respect to its optical axis x1.

The lighting device 1 comprises a second lens element 4, arranged downstream of the first lens element 3 along the main beam direction d, configured to receive refracted light from the first lens element 3 and to project said light in front of the lighting device 1. The second lens element 4 has an optical axis x2.

The first lens element 3 and the second lens element 4 are configured and arranged to each other, such that their optical axes x1, x2 are aligned co-axial and that the first lens element 3 and the second lens element 4 create a common focal point f. The common focal point f lies in a common focal plane fp, which is located on a, the second lens element 4 averting, side of the first lens element 3.

The plurality of light sources 2 are disposed on a light source holder 2*h*. The light source holder 2*h* is disposed relative to the first lens element 3 and the second lens element 4, such that the main beam direction d of light emitted by the plurality of light sources 2 is essentially parallel to the optical axis x1 of the first lens element 3 and the optical axis x2 of the second lens element 4. In the shown embodiment, the distance between the light source holder 2*h* and the first lens element 3 is smaller than the distance between the first lens element 3 and the second lens element 4.

Figure 3A:
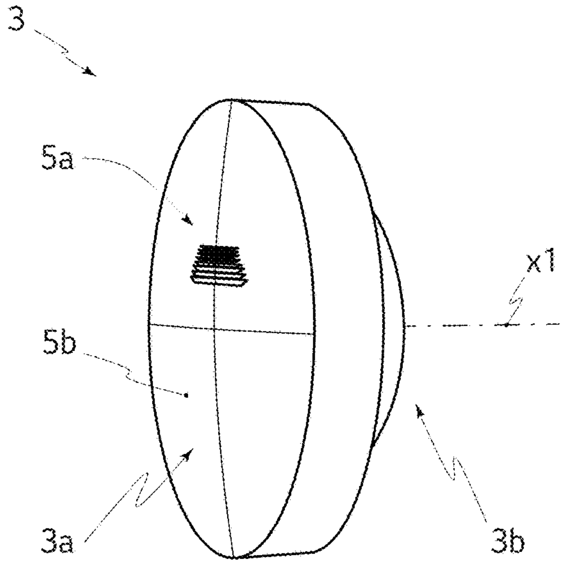
Figure 3B:
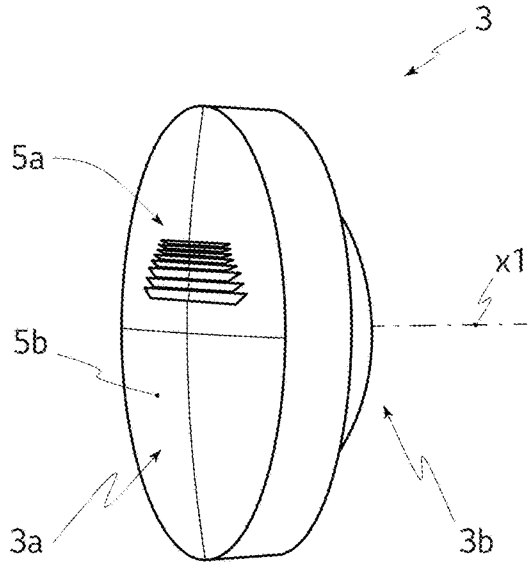

As depicted in FIG. 2 and in detail in FIGS. 3A and 3B, the light receiving surface 3*a* of the first lens element 3 is formed by a main-area 5*b* and a sub-area 5*a*. The sub-area 5*a* comprises a plurality of refraction elements 6 each comprising a light entry section. The refraction elements 6 of the sub-area 5*a* are configured in such a way, that impinging light gets refracted differently, preferably stronger towards the optical axis x1, than light refracted by the main-area 5*b*. The light source holder 2*h* and the light receiving surface 3*a* of the first lens element 3 are distanced to each other, such that a first fraction of light from the first light source group 2*a* is emitted towards the sub-area 5*a* and a second fraction, which is preferably larger than the first fraction, of light from the first light source group 2*a* is emitted towards the main-area 5*b*, and such that a first fraction of light from the second light source group 2*b* is emitted towards the sub-area 5*a* and a second fraction, which is preferably larger than the first fraction, of light from the second light source group 2*b* is emitted towards the main-area 5*b* of light receiving surface 3*a*. The first fraction of light from the first light source group 2*a* is larger than the first fraction of light from the second group of light sources 2*b*. In other words, the fraction of light from the first light source group 2*a* which is emitted towards the sub-area 5*a* is larger than the fraction of light from the second light source group 2*b* which is emitted towards the sub-area 5*a*, due to the positions of the first light source group 2*a* and the second light source group 2*b* relative to the light receiving surface 3*a*. In FIG. 2, only light rays from the first light source group 2*a* are shown (depicted as dashed lines).

As depicted in FIGS. 3A and 3B, the refraction elements 6 are formed as prismatic elements, having an essentially triangular cross-section, in the installation position, along a vertical sectional plane. Each prismatic element has a longitudinal extension, which is orthogonal to the optical axis x1 and preferably oriented horizontally. In FIG. 3A the refraction elements 6 have a shorter longitudinal extension compared to the refraction elements 6 shown in FIG. 3B. In the shown embodiment, the refraction elements 6 are formed as recesses or protrusions within the light receiving surface 3*a* of the first lens element 3. Preferably the sub-area 5*a* is surrounded by the main-area 5*b*.

The first light source group 2*a*, the second light source group 2*b*, the first lens element 3 and the second lens element 4 are configured to create a complete or partial, preferably adaptive, high beam light distribution. Said high beam light distribution is formed by at least two sections HB1, HB2 (see FIG. 2 and FIGS. 4A and 4B). The sub-area 5*a* and the main-area 5*b* of the light receiving surface 3*a* of the first lens element 3 are configured to refract impinging light in such a way, that the refracted first fraction and second fraction of light from the first light source group 2*a* correspond to a first illuminated area, which forms a first section HB1 of the high beam light distribution HB.

Furthermore, the refracted first fraction and second fraction of light from the second light source group 2*b* correspond to a second illuminated area, which forms a second section HB2 of the high beam light distribution HB.

The first section HB1 has a first intensity maximum and the second section HB2 has a second intensity maximum. The refraction of light by the sub-area 5*a* and the refraction of light by the main-area 5*b* is such that the first intensity maximum of the first section HB1 is vertically lower in front of the lighting device 1 than the second intensity maximum of the second section HB2 of the high beam light distribution.

In the shown embodiment, the plurality of light sources 2 comprise a (optional) third light source group 2*c*, which is disposed vertically lower than the second light source group 2*b*. Light from the third light source group 2*c* is emitted, preferably essentially only, towards the main-area 5*b*. Refracted light from the third light source group 2*c* corresponds to a third illuminated area, which forms a third section HB3 of the high beam light distribution HB. The third section HB3 has a third intensity maximum. The refraction of light from the third light source group 2*c* by the main-area 5*b* is such that the third intensity maximum is vertically higher than the first intensity maximum and the second intensity maximum in front of the lighting device 1. The third light source group 2*c* is disposed in a third row on the light source holder 2*h*, preferably oriented along a horizontal line, parallel to the second row, wherein the third row is vertically lower than the second row.

Preferably the lighting device 1 may comprise a shade element 12 (depicted in FIG. 6), preferably disposed—in the installation position—vertically above the first lens element 3, said shade element 12 is configured to block the first fraction of light from the second light source group 2*b*, which entered the first lens element 3 via the sub-area 5*a*, from traversing towards the second lens element 4.

Figure 4A:
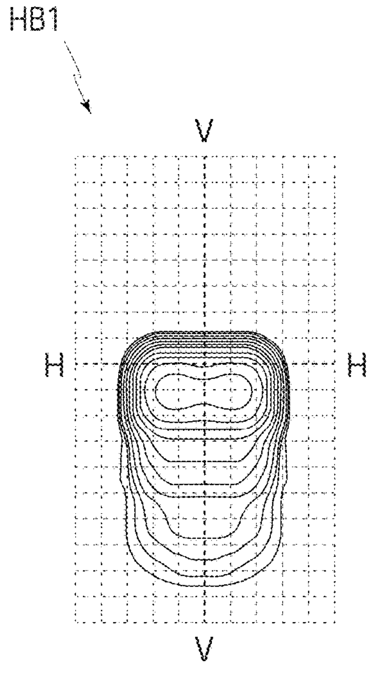
Figure 4B:
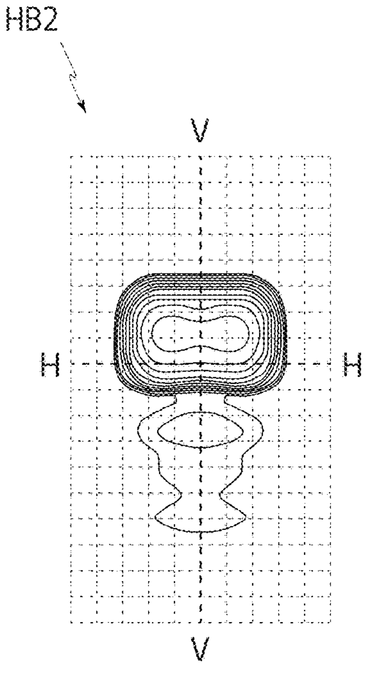
Figure 4C:
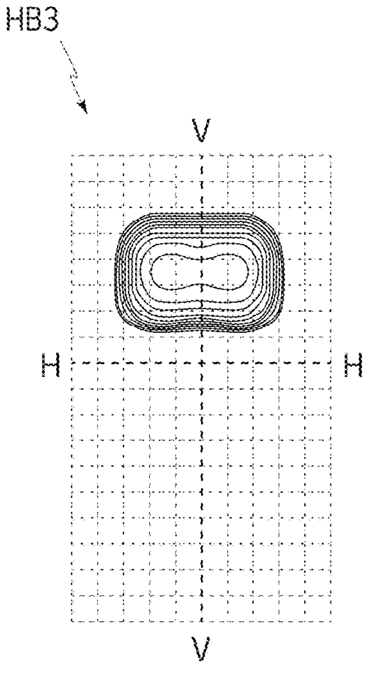

FIGS. 4A-4C each show a screen (located in front of the lighting device 1, oriented orthogonal to the optical axes x1, x2) which gets illuminated by the lighting device 1, wherein the H-H lines and the V-V lines are indicated.

In FIG. 4A, only the first group of light sources 2*a* is active and create the first section HB1 of the high beam light distribution HB. The vertically downwards prolonged illuminated area (i.e. the lower sub-section of HB1) is created by light refraction by the refraction elements 6. The vertically upwards illuminated area (i.e. the upper sub-section of HB1) is created by light refraction by the main-area 5*b*. The rounded squares illustrate an area lit by light coming from the main-area 5*b* and the downward protrusion illustrates an area lit by light coming from the sub-area 5*a*. The intensity maximum of the first illuminated area is located below the H-H line.

FIG. 4B shows the screen illuminated by the lighting device 1, but in this scenario, only the second group of light sources 2*b* is active and create the second section HB2 of the high beam light distribution HB. Since only a small fraction of the light from the second light source group 2*b* gets emitted towards the sub-area 5*a* (due to the close distance of the light source holder 2*h* to the light receiving surface 3*a* of the first lens element 3), only a small fraction of the light from the second light source group 2*b* gets refracted by the refraction elements 6. As a result, the vertically downward prolonged illuminated area is smaller (or has a smaller illuminated section) compared to FIG. 4A. The rounded squares illustrate an area lit by light coming from the main-area 5*b* and the downward protrusion illustrates an area lit by light coming from the sub-area 5*a*. The intensity maximum of the second illuminated area (and also of the second section HB2) is located slightly above the H-H line.

FIG. 4C shows a screen illuminated by the lighting device 1, but in this scenario, only the third group of light sources 2*c* is active and create the third section HB3 of the high beam light distribution HB. No light form the third group of light sources 2*c* gets emitted towards the sub-area 5*a* (due to the close distance of the light source holder 2*h* to the light receiving surface 3*a* of the first lens element 3). The illuminated area created by the third group of light sources 2*c* is well above the H-H line. The rounded squares illustrate an area lit by light coming from the main-area 5*b*.

By "stacking" or combining the illuminated areas shown in FIG. 4A, 4B and preferably 4C, the high beam light distribution is created.

Figure 5A:
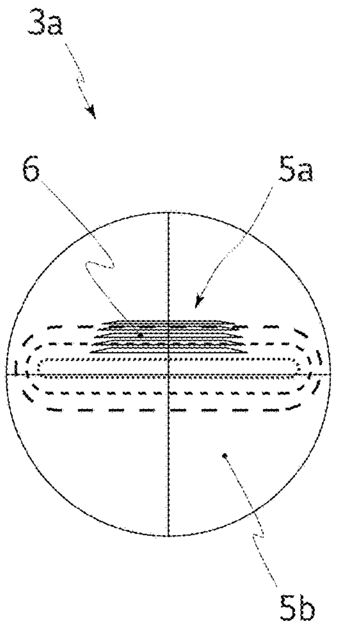
Figure 5B:
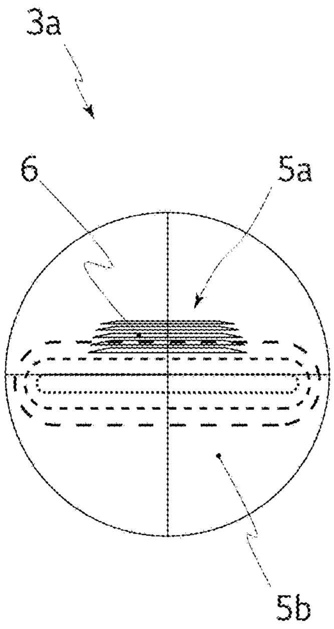
Figure 5C:
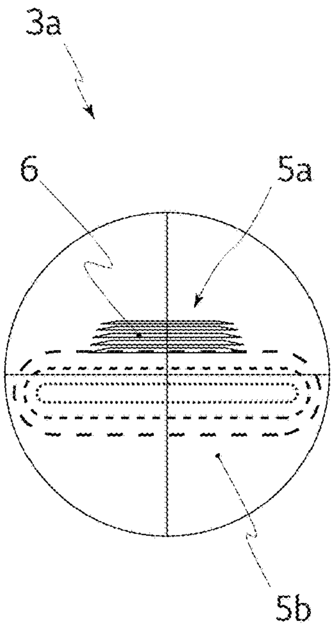

FIGS. 5A-5C each show the light receiving surface 3*a* of the first lens element 3 during the illumination states described in FIGS. 4A-4C.

In FIG. 5A, the first group of light sources 2*a* is active and illuminates (illustrated by dashed lines) the sub-area 5*a* and therefore the refraction elements 6 as well as the main area 5*b*.

In FIG. 5B, the second group of light sources 2*b* is active and illuminates (illustrated by dashed lines) a smaller portion (compared to the first group of light sources 2*a*) of the sub-area 5*a* with the refraction elements 6 and a larger portion of the main-area 5*b*.

In FIG. 5C, the third group of light sources 2*c* is active and illuminates (illustrated by dashed lines) only the main-area 5*b*.

As known to a person skilled in the art, the subsequent second lens element 4 is configured to invert the light coming from the first lens element 3, when projecting the light into a traffic space. As a result, the vertically lowest illumination of the light receiving surface 3*a*, i.e. FIG. 5C, corresponds to the vertically highest section HB3 of the high beam light distribution HB.

Figure 6:
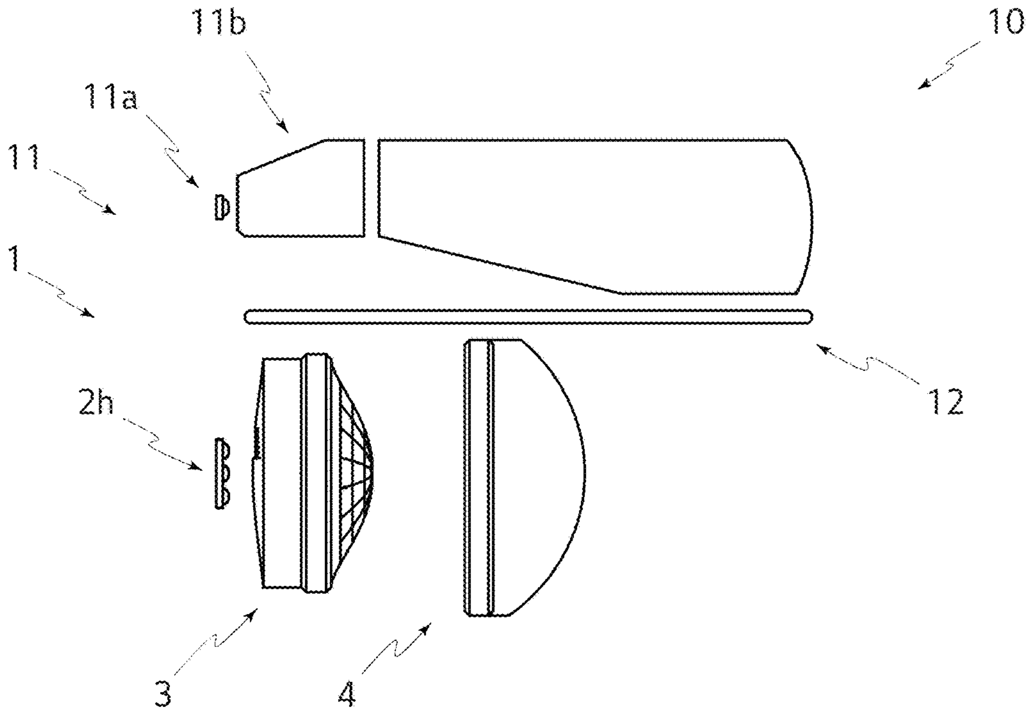

FIG. 6 shows another embodiment of the invention, a light module 10 for a vehicle headlamp, comprising a lighting device 1 and a secondary lighting device 11. The secondary lighting device 11 is configured to create a portion of a low beam light distribution. The light module 10 is configured to operate in at least two operation modes. The lighting device 1 and the secondary lighting device 11 are preferably mounted within a common housing (not shown) of the light module 10 and separated by a shade element 12, which extends along the main beam direction d.

In a first operation mode of the light module 10, the first light source group 2*a* and the second light source group 2*b* of the lighting device 1 are active and configured to create a complete or partial, preferably adaptive, high beam light distribution in conjunction with the first lens element 3 and the second lens element 4, wherein the secondary lighting device 11 is inactive.

In a second operation mode of the light module 10, a first portion of the first light source group 2*a* is active and a second portion of the first light source group 2*a* and the second light source group 2*b* is inactive. In the second operation mode the active first light source group 2*a*, the first lens element 3 and the second lens element 4 are configured to create a first portion of an asymmetric low beam light distribution, wherein a first illuminated area, which is created by refracted light from the active first portion of the first light source group 2*a* by the sub-area 5*a*, and preferably also by the main-area 5*b*, corresponds to the first portion of the asymmetric low beam light distribution.

The secondary lighting device 11 is configured to create (by means of a light source unit 11*a* and an optical device 11*b*, comprising e.g. a collimator and an optical element, corresponding to the light source unit 11*a*) a second portion of an asymmetric low beam light distribution. The first portion and the second portion form the asymmetric low beam light distribution, preferably the first portion forms an asymmetric portion of the asymmetric light distribution, which illuminates an area on the driving side of a vehicle, when the light module 10 is installed in a vehicle.

The second portion of the asymmetric low beam light distribution, which is created by the secondary lighting device 11, can form a light-dark boundary of the asymmetric low beam light distribution.

In the embodiment shown in FIG. 6, there is a shade element 12 disposed between the lighting device 1 and the secondary lighting device 11. The shade element 12 is configured to block the first fraction of light from the second light source group 2*b*, which entered the first lens element 3 via the sub-area 5*a*, from traversing towards the second lens element 4. The shade element 12 is configured to block light from the lighting device 1 being emitted towards the secondary lighting device 11 and vice versa.

LIST OF REFERENCE SIGNS

1 lighting device
2 plurality of light sources
2*a* first light source group
2*b* second light source group
2*c* third light source group
2*h* light source holder
3 first lens element
3*a* light receiving surface
3*b* light emitting surface
4 second lens element
5*a* sub-area of the first lens element
5*b* main-area of the first lens element
6 refraction elements
10 light module
11 secondary lighting device
11*a* light source unit
11*b* optical device
12 shade element
f common focal point
fp common focal plane
HB1 first section of the high beam light distribution
HB2 second section of the high beam light distribution
HB3 third section of the high beam light distribution
x1 optical axis of the first lens element
x2 optical axis of the second lens element
d main beam direction

The invention claimed is:

1. A lighting device (1) for a vehicle headlamp, wherein the lighting device (1) is configured to generate different light distributions, the lighting device (1) comprising:

a plurality of light sources (2) arranged in a first light source group (2*a*) and a second light source group (2*b*), wherein in an installation position of the lighting device (1)—when the lighting device (1) is installed in a vehicle headlamp in a vehicle—the first light source group (2*a*) is disposed vertically higher than the second light source group (2*b*), wherein the plurality of light sources (2) emit light along a main beam direction (d);

a first lens element (3), arranged downstream of the plurality of light sources (2) along the main beam direction (d), wherein the first lens element (3) comprises a light receiving surface (3*a*), facing the plurality of light sources (2), and a light emitting surface (3*b*), opposite of the light receiving surface (3*a*), wherein the first lens element (3) is configured to receive light from the plurality of light sources (2) via the light receiving surface (3*a*) and to emit received light via the light emitting surface (3*b*), wherein the first lens element (3) has an optical axis (x1), wherein the first lens element (3) is configured to refract light, in respect to its optical axis (x1); and a second lens element (4), arranged downstream of the first lens element (3) along the main beam direction (d), configured to receive refracted light from the first lens element (3) and to project said light in front of the lighting device (1), wherein the second lens element (4) has an optical axis (x2), wherein the first lens element (3) and the second lens element (4) are configured and arranged to each other, such that their optical axes (x1, x2) are aligned co-axial and that the first lens element (3) and the second lens element (4) create a common focal point (f), which lies in a common focal plane (fp), which is located on a, the second lens element (4) averting, side of the first lens element (3), wherein the plurality of light sources (2) are disposed on a light source holder (2*h*), wherein the light source holder (2*h*) is disposed relative to the first lens element (3) and the second lens element (4), such that the main beam direction (d) of light emitted by the plurality of light sources (2) is essentially parallel to the optical axis (x1) of the first lens element (3) and the optical axis (x2) of the second lens element (4), wherein the light receiving surface (3*a*) of the first lens element (3) is formed by a main-area (5*b*) and a sub-area (5*a*), wherein the sub-area (5*a*) comprises a plurality of refraction elements (6) each comprising a light entry section, wherein the refraction elements (6) of the sub-area (5*a*) are configured in such a way, that impinging light gets refracted differently than light refracted by the main-area (5*b*), wherein the light source holder (2*h*) and the light receiving surface (3*a*) of the first lens element (3) are distanced to each other, such that a first fraction of light from the first light source group (2*a*) is emitted towards the sub-area (5*a*) and a second fraction of light from the first light source group (2*a*) is emitted towards the main-area (5*b*), and such that a first fraction of light from the second light source group (2*b*) is emitted towards the sub-area (5*a*) and a second fraction of light from the second light source group (2*b*) is emitted towards the main-area (5*b*) of light receiving surface (3*a*), wherein the first fraction of light from the first light source group (2*a*) is larger than the first fraction of light from the second group of light sources (2*b*), and wherein the first light source group (2*a*), the second light source group (2*b*), the first lens element (3) and the second lens element (4) are configured to create a complete or partial, preferably adaptive, high beam light distribution, wherein the high beam light distribution is formed by at least two sections (HB1, HB2), wherein the sub-area (5*a*) and the main-area (5*b*) of the light receiving surface (3*a*) of the first lens element (3) are configured to refract impinging light in such a way, that the refracted first fraction and second fraction of light from the first light source group (2*a*) correspond to a first illuminated area, which forms a first section (HB1) of the high beam light distribution, and the refracted first fraction and second fraction of light from the second light source group (2*b*) correspond to a second illuminated area, which forms a second section (HB2) of the high beam light distribution, wherein said first section (HB1) has a first intensity maximum and said second section (HB2) has a second intensity maximum, wherein refraction of light by the sub-area (5*a*) and refraction of light by the main-area (5*b*) is such that the first intensity maximum of the first section (HB1) is vertically lower in front of the lighting device (1) than the second intensity maximum of the second section (HB2).

2. The lighting device (1) according to claim 1, wherein light sources of the first light source group (2*a*) are disposed along a first row on the light source holder (2*h*) and light sources of the second light source group (2*b*) are disposed along a second row on the light source holder (2*h*), wherein the second row is essentially parallel to the first row.

3. The lighting device (1) according to claim 1, wherein the first light source group (2*a*) and the second light source group (2*b*) are oriented on the light source holder (2*h*)—in the installation position—along horizontal lines respectively.

4. The lighting device (1) according to claim 1, wherein the refraction elements (6) are formed as prismatic elements, having an essentially triangular cross-section, in the installation position, along a vertical sectional plane.

5. The lighting device (1) according to claim 4, wherein each prismatic element has a longitudinal extension, which is orthogonal to the optical axis (x1) and oriented horizontally.

6. The lighting device (1) according to claim 1, wherein the refraction elements (6) are formed as recesses or protrusions within the light receiving surface (3*a*) of the first lens element (3).

7. The lighting device (1) according to claim 6, wherein the sub-area (5*a*) is surrounded by the main-area (5*b*).

8. The lighting device (1) according to claim 1, wherein the intensity maximum of the first illuminated area, formed by refracted light by the sub-area (5*a*), is located below a H-H line in an Isolux-diagram.

9. The lighting device (1) according to claim 1, wherein the intensity maximum of the second illuminated area, formed by refracted light by the main-area (5*b*), is located essentially at or above a H-H line in an Isolux-diagram.

10. The lighting device (1) according to claim 1, wherein each light source of the first light source group (2*a*) and each light source of the second light source group (2*b*) is individually controllable, depending on an operation mode of the lighting device (1).

11. The lighting device (1) according to claim 1, wherein the plurality of light sources (2) comprise a third light source group (2*c*), which is disposed vertically lower than the second light source group (2*b*), wherein light from the third light source group (2*c*) is emitted essentially towards the main-area (5*b*), wherein refracted light from the third light source group (2*c*) corresponds to a third illuminated area, which forms a third section (HB3) of the high beam light distribution, wherein said third section (HB3) has a third intensity maximum, wherein refraction of light from the third light source group (2*c*) by the main-area (5*b*) is such that the third intensity maximum is vertically higher than the first intensity maximum and the second intensity maximum in front of the lighting device (1).

12. The lighting device (1) according to claim 11, wherein the third light source group (2*c*) is disposed in a third row on the light source holder (2*h*), parallel to the second row, wherein the third row is vertically lower than the second row.

13. The lighting device (1) according to claim 1, wherein the lighting device (1) comprises a shade element (12), wherein the shade element (12) is configured to block the first fraction of light from the second light source group (2*b*), which entered the first lens element (3) via the sub-area (5*a*), from traversing towards the second lens element (4).

14. The lighting device (1) according to claim 13, wherein the shade element (12) in an installed position is disposed vertically above the first lens element (3).

15. The lighting device (1) according to claim 1, wherein the plurality of light sources (2) are disposed at a light source surface of the light source holder (2*h*), wherein the light source surface lies essentially within the common focal plane (fp).

16. A light module (10) for a vehicle headlamp, said light module (10) is configured to generate different light distributions, each correlating to a different operation mode of the light module (10), the light module (10) comprising:

a lighting device (1) according to claim 1; and a secondary lighting device (11), configured to create a portion of a low beam light distribution, wherein the light module (10) is configured to operate in at least two operation modes, wherein:

in a first operation mode of the light module (10), at least a portion of the first light source group (2*a*) and at least a portion of the second light source group (2*b*) of the lighting device (1) are active and configured to create a complete or partial high beam light distribution in conjunction with the first lens element (3) and the second lens element (4), wherein the secondary lighting device (11) is active, and in a second operation mode of the light module (10), a first portion of the first light source group (2*a*) is active and a second portion of the first light source group (2*a*) and the second light source group (2*b*) is inactive, wherein in the second operation mode the active first light source group (2*a*), the first lens element (3) and the second lens element (4) are configured to create a first portion of an asymmetric low beam light distribution, wherein a first illuminated area, which is created by refracted light from the active first portion of the first light source group (2*a*) by the sub-area (5*a*), and preferably also by the main-area 5*b*, corresponds to the first portion of the asymmetric low beam light distribution, wherein the secondary lighting device (11) is configured to create a second portion of an asymmetric low beam light distribution, wherein the first portion and the second portion form the asymmetric low beam light distribution, wherein the first portion forms an asymmetric portion of the asymmetric light distribution, which illuminates an area on the driving side of a vehicle, when the light module is installed in a vehicle.

17. The light module (10) according to claim 16, wherein the second portion of the asymmetric low beam light distribution, which is created by the secondary lighting device (11), forms a light-dark boundary of the asymmetric low beam light distribution.

18. A vehicle headlamp, comprising a light module (10) according to claim 16.

19. A vehicle headlamp, comprising a lighting device (1) according to claim 1.

20. The lighting device (1) according to claim 1, wherein:

the refraction elements (6) of the sub-area (5*a*) are configured such that impinging light gets refracted stronger towards the optical axis (x1) than light refracted by the main-area (5*b*);

the second fraction of light from the first light source group (2*a*) emitted towards the main-area (5*b*) is larger than the first fraction of light from the first light source group (2*a*) emitted towards the sub-area (5*a*); and the second fraction of light from the second light source group (2*b*) emitted towards the main-area (5*b*) is larger than the first fraction of light from the second light source group (2*b*) emitted towards the sub-area (5*a*).

* * * * *